United States Patent [19]

Grenke

[11] Patent Number: 5,628,516
[45] Date of Patent: May 13, 1997

[54] SEALING ASSEMBLY FOR ROTARY OIL PUMPS HAVING MEANS FOR LEAKS DETECTION AND METHOD OF USING SAME

[76] Inventor: Edward Grenke, 86 Country Club Estates, 52328 Hwy. 21, Sherwood Park, Alberta, Canada, T8B 1J9

[21] Appl. No.: 678,951

[22] Filed: Jul. 12, 1996

Related U.S. Application Data

[63] Continuation of Ser. No. 294,828, Aug. 29, 1994, abandoned.

[51] Int. Cl.[6] ............................. F16J 15/18; F01D 11/00
[52] U.S. Cl. ........................ 277/1; 277/2; 277/50; 277/75; 277/79; 277/123; 277/205; 415/175; 415/230
[58] Field of Search ........................ 277/1, 2, 24, 35, 277/37, 50, 58, 59, 71, 79, 110, 111, 112, 123, 167.3, 189, 205, 75; 415/109, 118, 175, 230, 901

[56] References Cited

U.S. PATENT DOCUMENTS

| | | | |
|---|---|---|---|
| 1,976,200 | 10/1934 | Swanson | 415/175 |
| 2,471,198 | 12/1949 | Cormany | 166/14 |
| 2,491,599 | 12/1949 | Allen | 277/2 |
| 3,350,105 | 10/1967 | Borwning et al. | 277/205 |
| 3,364,523 | 1/1968 | Schippers | 277/79 |
| 3,891,031 | 6/1975 | Ortiz | 166/68.3 |
| 3,914,752 | 10/1975 | Howard et al. | 277/2 |
| 4,087,211 | 5/1978 | Pochyly | 417/424 |
| 4,089,624 | 5/1978 | Nichols et al. | 417/362 |
| 4,246,976 | 1/1981 | McDonald | 175/107 |
| 4,314,611 | 2/1982 | Willis | 173/57 |
| 4,342,537 | 8/1982 | Goyne | 415/175 |
| 4,372,379 | 2/1983 | Kulhanek et al. | 166/68.5 |
| 4,511,307 | 4/1985 | Drake | 415/172 R |
| 5,135,238 | 8/1992 | Wells et al. | 277/59 |
| 5,244,183 | 9/1993 | Calvin et al. | 277/2 |
| 5,370,179 | 12/1994 | Mills | 166/68.5 |

FOREIGN PATENT DOCUMENTS

| | | | |
|---|---|---|---|
| 0104504 | 9/1983 | European Pat. Off. | 277/58 |
| 1156602 | 5/1958 | France | 277/59 |
| 388711 | 2/1965 | Switzerland | 277/59 |

*Primary Examiner*—William A. Cuchlinski, Jr.
*Assistant Examiner*—John L. Beres
*Attorney, Agent, or Firm*—Shoemaker and Mattare, Ltd

[57] ABSTRACT

An assembly for restraining oil leakage in a rotary oil well pump includes a stationary member and a rotary member. The rotary member is secured to the rotating rod and is sealed against the rod by conventional compressed packing. The rotary member has a cylindrical portion rotating within a cylindrical recess of the stationary member, with an annular recess defined between them. The recess contains two or more annular seal cartridges stacked one after the other in the annular space. The cartridges are designed to individually resist the ingress of the pressurized oil, so that leakage takes place sequentially past the individual cartridges. Leak passages are provided in the stationary member and are in communication with each of the cartridges respectively. When oil appears at any given leak passage, this signifies that the oil has bridged the defences of that cartridge and any cartridge or cartridges which are upstream of the leaking cartridge.

19 Claims, 4 Drawing Sheets

5,628,516

SEALING ASSEMBLY FOR ROTARY OIL PUMPS HAVING MEANS FOR LEAKS DETECTION AND METHOD OF USING SAME

This is a continuation of application Ser. No. 08/294,828, filed on Aug. 29, 1994, now abandoned.

FIELD OF THE INVENTION

This invention relates generally to the oil production industry, and has to do particularly with improving the efficiency of the seals used to seal a rotary rod of a progressive gravity oil well pump, in order to prevent leakage of oil.

BACKGROUND OF THE INVENTION

Many conventional oil wells are operated by a downhole pump at or close to the bottom of the well, the pump being of a conventional reciprocating kind actuated by a rod string which in turn is reciprocated vertically by a pump jack. Recently, many conventional reciprocating pumps have been replaced by rotary-drive progressive cavity pumps. The rotary pumps are particularly suited for the production of crude oil laden with sand and water.

In the conventional vertically reciprocating pumps, the apparatus is typically constructed in such a way that a single stuffing box provides control of leakage and loss of oil. This conventional stuffing box is stationary and is secured to a stationary housing. The part of the upper portion of the rod which actually contacts the stuffing is usually highly polished, thus ensuring minimal leakage and minimal damage to the pacing material. With the introduction of rotary pumps, it has been generally found that, if the conventional stuffing box (developed for vertical pumps) is used for the rotary pumps, oil leakage develops relatively early, requiring frequent maintenance and frequent replacement of the packing material.

Prior Art

The following provide a general survey of the background art:

U.S. Pat. No. 2,471,198, issued on May 24, 1949 to D. R. Cormany;
U.S. Pat. No. 3,891,031, issued on Jun. 24, 1975 to Ortiz;
U.S. Pat. No. 4,087,211, issued on May 2, 1978 to Pochyly;
U.S. Pat. No. 4,089,624, issued on May 16, 1978 to Nichols et al;
U.S. Pat. No. 4,314,611, issued on Feb. 9, 1982 to Willis;
U.S. Pat. No. 4,372,379, issued on Feb. 8, 1983 to Kulhanek et al.

SUMMARY OF THIS INVENTION

Broadly stated, the present invention provides an improved assembly for restraining oil leakage from rotary oil well pumps by providing a special sleeve to surround the rod with packing, the sleeve rotating with the rod and therefore not requiring a dynamic seal between them. The sleeve in turn is rotatably mounted within a recess defined by a stationary member, and a plurality of annular seal cartridges are provided to occupy the space between the sleeve and the stationary member. The seal cartridges are constructed in such a way as to resist the leakage of oil on a sequential basis. Thus, oil must first get past an initial seal cartridge before gaining access to the second in line, and the second cartridge must break down before the oil gains access to the third cartridge. Leak passages corresponding to the plurality of seal cartridges indicate by the appearance of oil the furthest downstream cartridge to which the oil has gained access.

More particularly, this invention provides, for use with a rotary pump for oil wells in which an elongate rod supports and rotates the rotor of a down-hole pump, an assembly for restraining oil leakage, comprising:

a stationary first member defining a through-bore for the rod, and a substantially cylindrical recess coaxial with said bore, the cylindrical recess being defined by a cylindrical wall, the first member having an external wall, a rotary second member also defining a through-bore, the rod extending through the through-bore of the second member and rotating therewith, the second member having a substantially cylindrical portion received coaxially in said recess, the cylindrical portion being defined by an outer cylindrical surface which has a smaller diameter than the recess so as to leave an annular space between the recess and the cylindrical surface, the annular space having an upstream end where oil under pressure seeks to enter the space, and a downstream end opposite the upstream end, a plurality of annular seal cartridges stacked within said annular space, each cartridge having, in axial section:
  a) a knife-edge corner slidably contacting said cylindrical portion,
  b) a first open space downstream of the knife-edge corner and adjacent the cylindrical portion, and a second open space adjacent the cylindrical wall, and
  c) passageway means through which the two spaces are in communication, for each seal cartridge a leak passage through the first member, the leak passage communicating the respective open spaces with said external wall, and plug means for closing at least one of the passages.

Additionally, this invention provides a method for restraining oil leakage in a pump for oil wells in which an elongate rod supports and rotates the rotor of a down-hole pump, utilizing an assembly including a stationary first member defining a through bore for the rod and a substantially cylindrical recess coaxial with said bore, the cylindrical recess being defined by a cylindrical wall, the first member having an external wall, a rotary second member also defining a through-bore, the rod extending through the through-bore of the second member and rotating therewith, the second member having a substantially cylindrical portion received coaxially in said recess, the cylindrical portion being defined by an outer cylindrical surface with a smaller diameter than the recess so as to leave an annular space between them, the annular space having an upstream end where oil under pressure seeks to enter the space, and a downstream end opposite the upstream end;

said method comprising the steps:
  a) providing a plurality of stacked annular seal cartridges within said annular space, each cartridge having, in axial section: a knife edge corner in sliding contact with said cylindrical portion, a first open space downstream of said corner and adjacent the cylindrical portion, a second open space adjacent the cylindrical wall, and passageway means through which the two spaces are in communication,
  b) providing, for each seal cartridge, a leak passage through the first member, each leak passage communicating the respective open spaces with said external wall,
  c) injecting a lubricant through the leak passage of the furthest upstream seal cartridge and then plugging that leak passage, while leaving open the leak passage of a seal cartridge downstream of the furthest upstream cartridge, d) monitoring the left-open leak passage for leaking oil, and e) when such leaking oil is detected, shutting down the pump and replacing at least those seal cartridges past which oil has leaked.

GENERAL DESCRIPTION OF THE DRAWINGS

One embodiment of this invention is illustrated in the accompanying drawings, in which like numerals denote like parts throughout the several views, and in which.

DETAILED DESCRIPTION OF THE DRAWINGS

Figure 1:
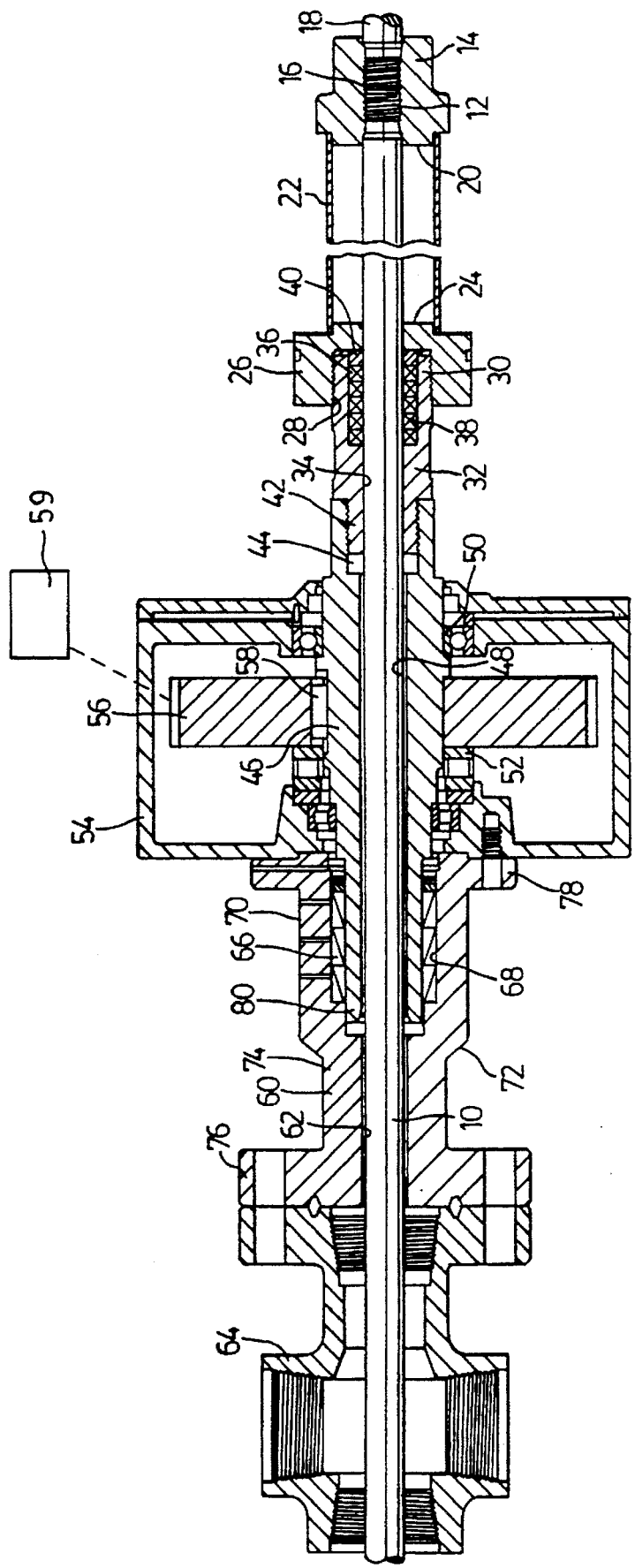
FIG. 1 is an axial sectional view through an apparatus used at the wellhead of a downhole rotary pump for supporting and rotating the rod, and for restraining leakage of oil from the well to the environment.

Attention is first directed to FIG. 1, which shows, in axial section, an elongate rod 10 which supports and rotates the rotor of a downhole pump (not illustrated). In FIG. 1 the upper end is to the right, and the lower end is to the left.

At its top end (to the right in FIG. 1), the rod 10 has an external thread 12 which engages a nut member 14 at one end of a threaded bore 16 in the nut member 14, the other end of the bore 16 being engaged by the threaded end of a lift rod 18.

At its lower (leftward) end, the nut member 14 has a non-circular protuberance 20 which is engaged by a non-circular, hollow tail bar 22 of which the other end engages a similar protuberance 24 on a further nut member 26.

The nut member 26 defines an internally threaded blind bore 28 adapted to be secured to the upper, threaded end 30 of a packing member 32. It will be noted that the packing member 32 and the nut member 26 together define a through-bore 34 through which the rod 10 passes. The packing member 32 defines at its upper end (to the right in FIG. 1) an annular packing cavity 36 containing conventional packing 38. An annular closure member 40 compresses the packing 38, and is pushed downwardly by the tightening of the nut member 26. The closure member 40 can be selected to be of different axial dimensions, so as to provide the right degree of compression on the packing 38 when the nut member 26 has been screwed down as far as possible on the packing member 32.

The packing member 32 has a reduced portion 42 which surrounds the rod 10 and which has an external thread adapted to fit into an internally threaded, cylindrical recess 44 defined at the top (rightward end) of a sleeve member 46, the latter having a through-bore 48 for receiving the rod 10.

The sleeve member 46 is constructed in such a way as to receive a radial bearing 50 and a thrust bearing 52, which support the sleeve member 46 for rotation with respect to a frame member 54 which is solidly connected to the wellhead housing by means which are not shown and which do not play any part in the present invention.

In the assembly of FIG. 1, a pinion gear 56 is locked for rotation with the sleeve member 46 by a key 58. Means 59 are provided for rotating the gear 56, along with the sleeve member 46.

Bolted to the underside (the left side in the drawing) of the frame 54 is a stationary first member 60 which defines a through bore 62 for the rod 10 and is in turn bolted or otherwise fastened to a T-member 64 which forms no part of the present invention.

As can be seen in FIG. 1, the stationary first member 60 further defines a substantially cylindrical recess 66 which is coaxial with the through-bore 62 and which is primarily defined by a cylindrical wall 68. The first member 60 further has an external wall 70, which reduces through a frusto-conical transition 72 to a throat portion 74. The first member 60 further has a lower flange 76 for securement to the T-member 64, and an upper flange 78 for securement to the frame member 54.

Figure 4:
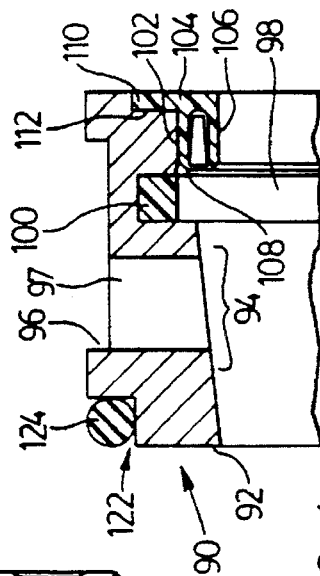
FIG. 4 is an axial sectional view, to a larger scale, through a seal cartridge for use with this invention.
Figure 3:
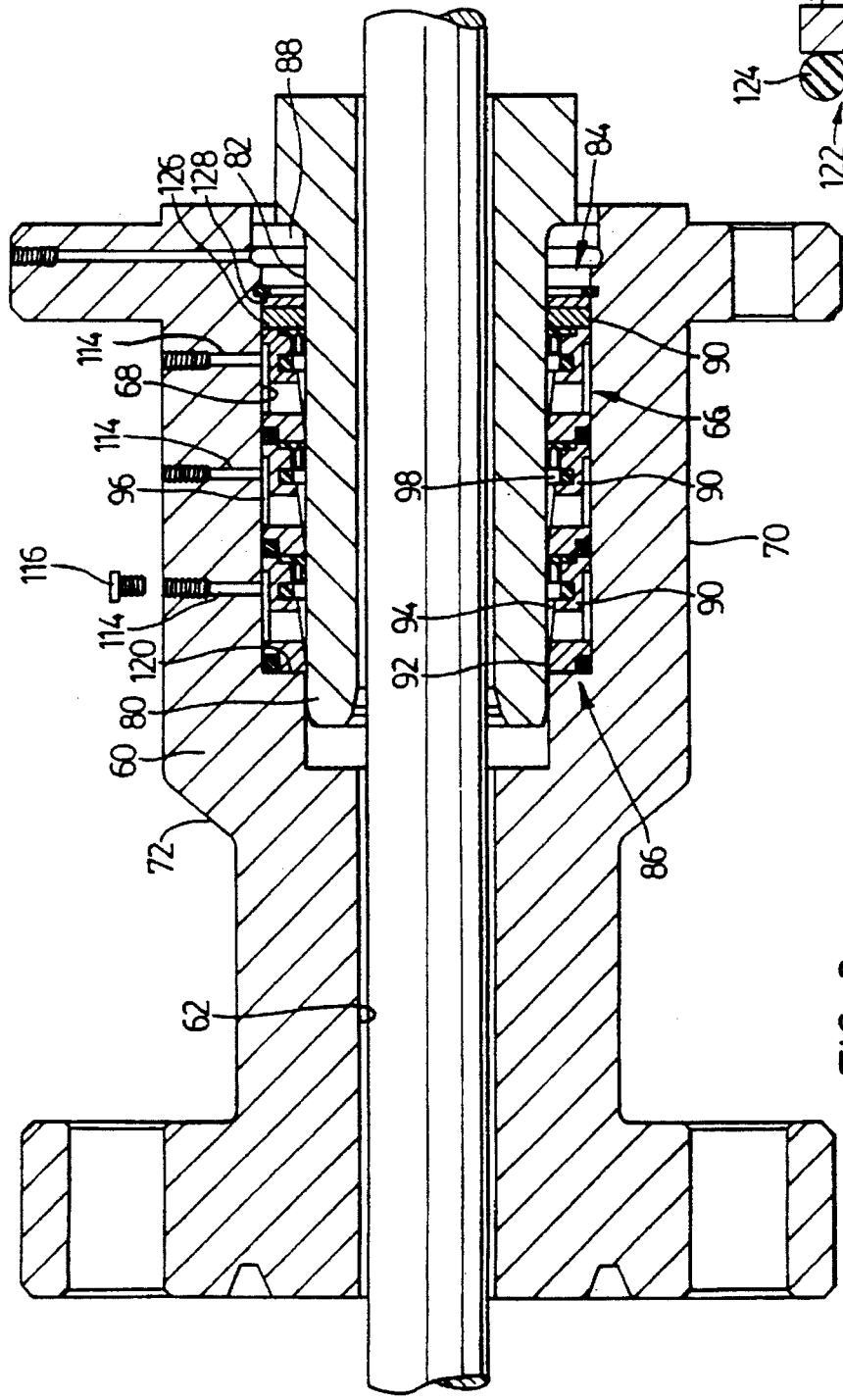
FIG. 3 is an axial sectional view through the portion of the apparatus where the dynamic rotary seals are located.

Attention is now directed to FIGS. 3 and 4, for a more detailed description of the contents of the cylindrical recess 66.

As particularly seen in FIG. 3, the sleeve member 46 has an integral tail portion 80, to be referred to hereinafter as a cylindrical portion, and the cylindrical portion 80 is received coaxially in the recess 66. The cylindrical portion 80 has an outer cylindrical surface which has a smaller diameter than the cylindrical recess 66, so as to leave an annular space 84 between them. The annular space 84 has an upstream end 86 where oil under pressure (arriving along the through-bore 62) seeks to enter the annular space 84, and a downstream end 88 opposite the upstream end 86.

Located within the cylindrical recess 66 (annular space 84) are three annular seal cartridges 90 which are stacked one behind the other in the annular space 84.

As can be seen by comparing FIG. 3 and 4, each cartridge has, in axial section:

(a) a knife-edge corner 92 which slidably contacts the cylindrical portion 80, (b) a first open space 94 downstream (rightward) from the knife-edge corner 92 and adjacent the cylindrical portion 80, and a second open space 96 adjacent the cylindrical wall 68. Passageway means 97 (preferably in the form of spaced-apart passageways drilled radially into each cartridge) provide communication between the first open space 94 and the second open space 96.

Each seal cartridge 90 further defines an inwardly open groove 98 downstream of the first open space 94, with a resilient ring 100 in the groove 98. The resilient ring is adapted to be compressed by the freezing and expansion of any water within the open spaces 94 and 96.

Each seal cartridge 90 further includes a support surface 102 substantially parallel with the outer cylindrical surface 82, and located downstream of the groove 98. Also provided is an O-ring seal element 104 which is generally U-shaped in radial section, and which includes two arms 106 and 108, of which the arm 106 is adapted to lie against the outer cylindrical surface 82, and of which arm 108 is adapted to lie against the support surface 102, in such a way that the interior of the U-shape is open downwardly (leftwardly) toward the first open space 94. This is clearly seen in FIG. 4.

The O-ring seal element 104 further has an outwardly projecting integral flange 110 which lies within a flange recess 112 defined by the seal cartridge 90, and arranged such that the flange 110 is compressed and gripped between the respective cartridge and the next adjacent cartridge. This is best seen in FIG. 3.

It is also to be noted that the first member 60 provides, for each seal cartridge 90, a leak passage 114, each leak passage 114 communicating the open spaces (of the respective seal cartridge 90) with the external wall 70. An externally threaded plug 116 is provided for closing at least one of the passages.

It will be noted that the annular space 84 defined between the cylindrical wall 68 and the cylindrical surface 82 is closed at its upstream (leftward) end by an annular wall 120, and that the lowermost (furthest leftward) seal cartridge 90 abuts the wall 120.

Each seal cartridge 90 has an outer, peripheral, downstream 122 (see FIG. 4) adjacent the cylindrical wall 68 of the member 60, and an O-ring seal 124 within the peripheral recess 122.

FIG. 3 shows the provision of lock means urging the annular seal cartridges 90 downwardly (leftwardly) against the annular wall 120.

More specifically, the lock means includes two annular members 126 and 128, along with a circlip lodged in a corresponding groove in the cylindrical wall 68.

Figure 5:
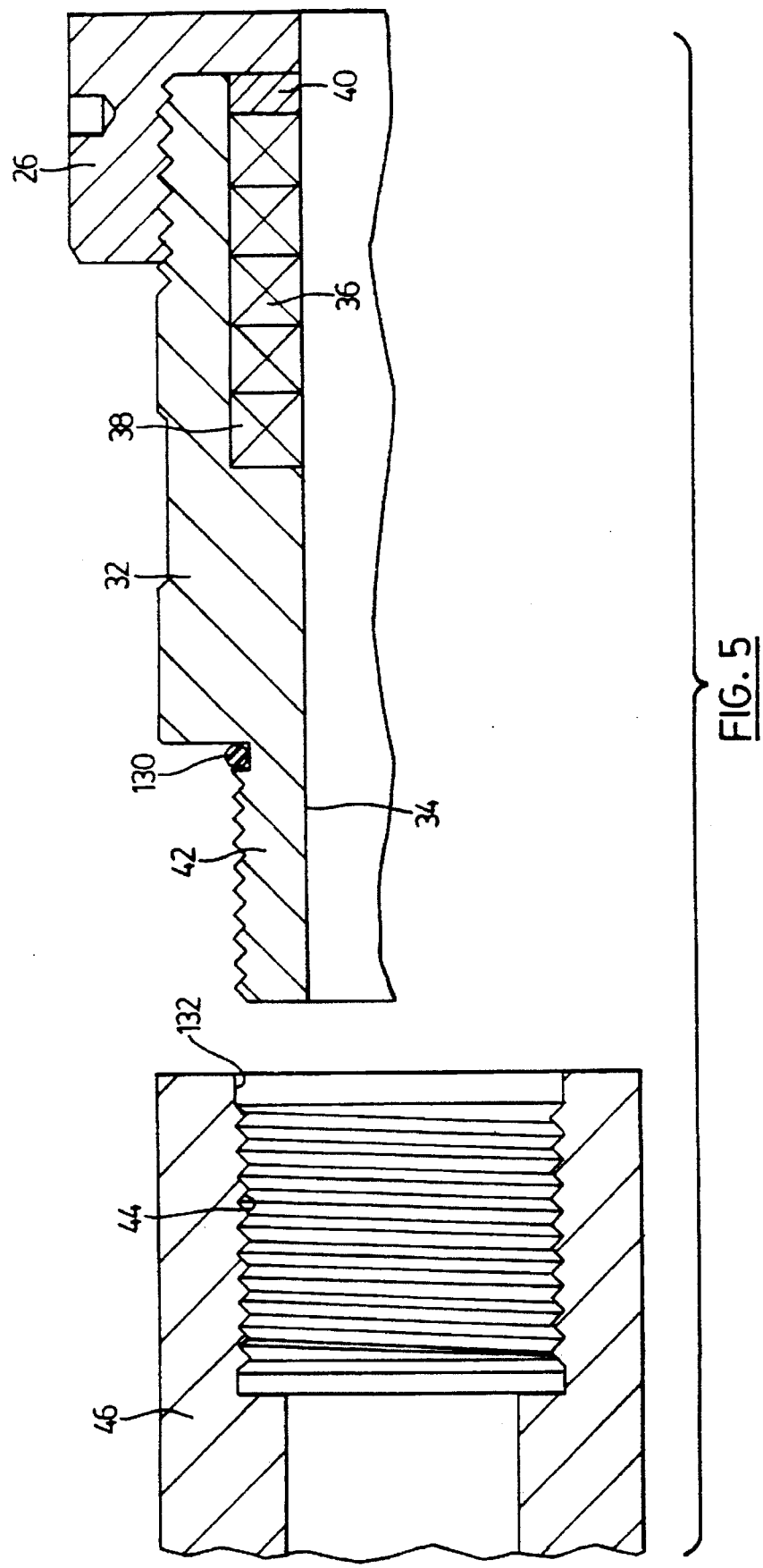
FIG. 5 is a partial, exploded, axial sectional view through a portion of the apparatus where the packing is located.

Attention is now directed briefly to FIG. 5, which shows a version of the packing member 32 having slightly different dimensional characteristics from that shown in FIG. 1. However, all the main components are present in FIG. 5, and in addition there is shown an O-ring 130 received in a corresponding recess, the O-ring 130 being compressed against the corner portion 132 of the sleeve member 46'. This ensures that no leakage will occur at the joint between the packing member 32 and the sleeve member 46.

Figure 2:
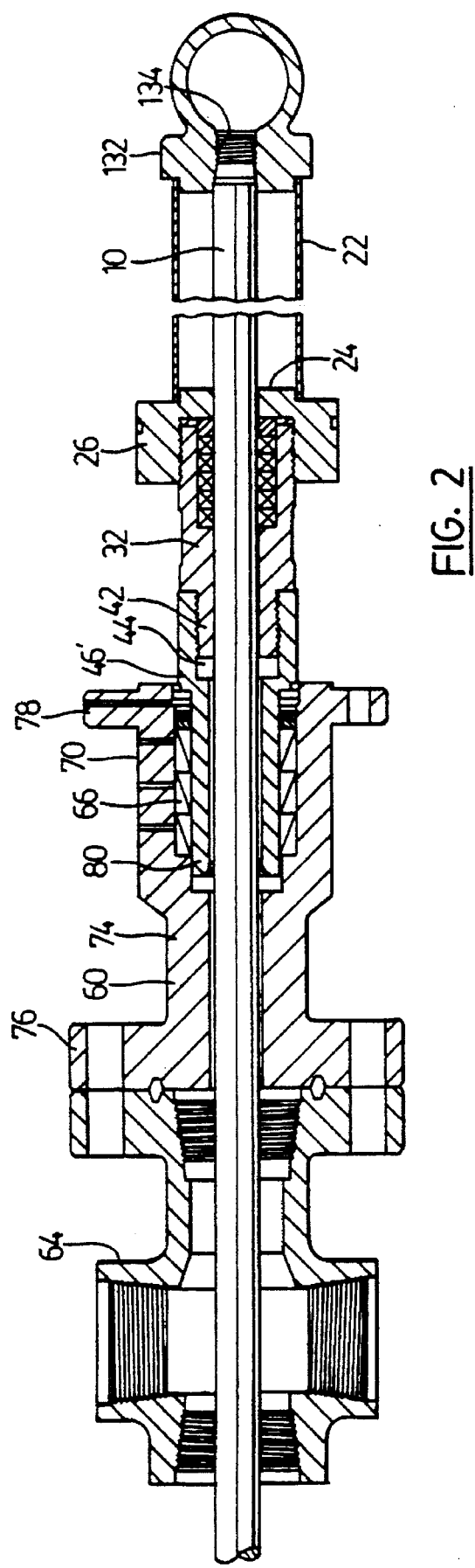
FIG. 2 is a view similar to that of FIG. 1, showing a slightly simplified version.

FIG. 2 illustrates a variant of the assembly shown in FIG. 1. In FIG. 2, the frame member 54 is absent, as is the pinion gear 56 and the mounting bearings. In the arrangement of FIG. 2, a different means (not shown) would be required for rotating the sleeve member 46'.

Another difference in FIG. 2 is the provision of a lift ring 132 instead of the nut member 14 in FIG. 1. The lift ring 132 has a threaded bore 134 with which the upper, externally threaded end of the rod 10 can be engaged.

Aside from the mentioned differences, all of the other parts are identical as between FIGS. 1 and 2. Below is described a method for utilizing the apparatus just described, in restraining oil leakage in a pump for oil wells, in which an elongate rod supports and rotates the rotor of a down-hole pump.

The method involves, firstly, providing all of the components illustrated in the figures and described previously, including the provision of a plurality of stacked annular seal cartridges 90 with the described configuration, and providing, for each seal cartridge 90, a leak passage 114 through the first member 60, each leak passage 114 communicating the respective open spaces (94, 96) with the external wall 70.

In one mode of utilization, prior to the initiation of pumping, a lubricant such as grease or heavy oil is injected through the leak passage of the furthest upstream (furthest leftward in FIGS. 1 and 2) seal cartridge 90, and then that leak passage is plugged, while leaving open the leak passage of the seal cartridge next downstream of the furthest upstream cartridge. Utilizing three cartridges as illustrated in the figures, we can speak of an upstream cartridge, a downstream cartridge, and an intermediate cartridge. Thus, the lubricant is injected into the upstream cartridge, and the corresponding leak passage is plugged and sealed. The leak passage for the intermediate cartridge, however, is left open. In this particular mode of operation, the third leak passage (that for the downstream cartridge) can be closed with a plug of the kind shown at 116 in FIG. 3.

Pumping is then initiated, and the operator monitors the intermediate leak passage for leaking oil. When leaking oil is detected at the leak passage for the intermediate cartridge, this signifies that oil has got past the knife-edge 92 of both the upstream and the intermediate cartridges. At this point, the operator may decide to shut down the pumping operation, and replace at least the upstream and intermediate cartridges (which can no longer withstand the oil pressure). Alternatively, the operator can remove the plug from the downstream leak passage and use it to plug up the leak passage for the intermediate cartridge. This will shift attention to the third cartridge. When oil appears at the open leak passage of the third cartridge, this will signify that the oil has now got past the knife-edge seal 92 of all three cartridges. At this point, the operation should be shut down and all seal cartridges should be replaced.

While several variants of this invention have been illustrated in the accompanying drawings and described hereinabove, it will be evident to those skilled in the art that changes and modifications may be made therein without departing from the essence of this invention, as set forth in the appended claims.

The embodiments of the invention in which an exclusive property or privilege is claimed are defined as follows:

1. For use with an oil well having a top end and a bottom end, the combination of:
    a) a downhole pump which includes a rotor and a stator, and which is adapted for positioning within and adjacent said bottom end of the well, an elongate rod adapted to extend down the well and support the rotor for rotation, the rod being adapted to transmit rational motion to the rotor from a means for generating rational torque, and
    b) an assembling for restraining oil leakage, comprising:
        a stationary first member defining a through-bore for the rod, and a substantially cylindrical recess coaxial with said bore, the cylindrical recess being defined by a cylindrical wall, the first member having an external wall,
        a rotary second member also defining a through-bore, the rod extending through the through-bore of the second member and rotating therewith, the second member having a substantially cylindrical portion received coaxially in said recess, the cylindrical portion being defined by an outer cylindrical surface which has a smaller diameter than the recess so as to leave an annular space between the recess and the cylindrical surface, the annular space having an upstream end where oil under pressure seeks to enter the space, and a downstream end opposite the upstream end,
        a plurality of annular seal cartridges stacked within said annular space, each seal cartridge having, in axial section; a knife-edge corner slidably contacting said cylindrical portion, a first open space downstream of the knife-edge corner and adjacent the cylindrical portion, a second open space adjacent the cylindrical wall, a passageway means through which the two spaces are in communication, and means defining a leak passage through the first member, the leak passage communicating the respective open spaces with said external wall, and
        plug means for closing at least one of the passages.
2. The combination claimed in claim 1, in which each seal cartridge further has:
    a radially inwardly open groove downstream of the first open space, and
    a resilient ring in said groove, the resilient ring being adapted to be compressed by the freezing and expansion of any water within the open spaces and passageway means of the seal cartridge.

3. The combination claimed in claim 2, in which each seal cartridge further has:
   a support surface substantially parallel with said outer cylindrical surface, located downstream of said groove, and
   on O-ring seal element which is U-shaped in radial section, including two arms of which one is adapted to lie against said outer cylindrical surface, and of which the other is adapted to lie against said support surface, such that the interior of the U-shape is open toward said first open space, the O-ring seal element further having a radially outwardly projecting integral flange lying in a flange recess in the respective seal cartridge, such that the flange is compressed and gripped between the respective cartridge and the next adjacent cartridge.

4. The combination claimed in claim 3, in which there are three annular seal cartridges.

5. The combination claimed in claim 3, in which the annular space defined between said cylindrical wall and said cylindrical surface is closed by an annular wall at its upstream end, each seal cartridge further having an outer peripheral recess adjacent the cylindrical wall of the first member, and an O-ring seal compressed within said peripheral recess, and lock means urging said annular seal cartridges against said annular wall.

6. The combination claimed in claim 5, in which the lock means includes at least one annular member located downstream of the annular seal cartridges, and, immediately downstream of the annular member, a circlip lodged in a groove in the cylindrical wall.

7. The combination claimed in claim 5, in which the rotary second member includes a packing portion defining an annular cavity surrounding the rod and closed at both ends, and a plurality of packing elements compressed within said annular cavity.

8. The combination claimed in claim 3, in which the rotary second member includes a packing portion defining an annular cavity surrounding the rod and closed at both ends, and a plurality of packing elements compressed within said annular cavity.

9. The combination claimed in claim 1, in which there are three annular seal cartridges.

10. The combination claimed in claim 1, in which the annular space defined between said cylindrical wall and said cylindrical surface is closed by an annular wall at its upstream end, each seal cartridge further having an outer peripheral recess adjacent the cylindrical wall of the first member, and an O-ring real compressed within said peripheral recess.

11. The combination claimed in claim 10, in which the rotary second member includes a packing portion defining an annular cavity surrounding the rod and closed at both ends, and a plurality of packing elements compressed within said annular cavity.

12. The combination claimed in claim 1, in which the rotary second member includes a packing portion defining an annular cavity surrounding the rod and closed at both ends, and a plurality of packing elements compressed within said annular cavity.

13. The combination claimed in claim 12, in which the packing portion is threadably connected to said cylindrical portion of the second member.

14. The combination claimed in claim 12, in which the said assembly further includes a stationary framework to which said first member is secured, the framework including thrust and radial bearing means supporting the second member for rotation, drive means connected to the second member for receiving drive torque, and connection means allowing the rod to be both supported and rotated by said second member.

15. The combination claimed in claim 1, in which the said assembly further includes a stationary framework to which said first member is secured, the framework including thrust and radial bearing means supporting the second member for rotation.

16. The combination claimed in claim 1, in which the assembly further includes drive means connected to the second member for receiving drive torque, and connection means allowing the rod to be both supported and rotated by said second member.

17. A method for restraining oil leakage in a pump for oil wells in which an elongate rod supports and rotates the rotor of a down-hole pump, utilizing an assembly including a stationary first member defining a through bore for the rod and a substantially cylindrical recess coaxial with said bore, the cylindrical recess being defined by a cylindrical wall, the first member having an external wall, a rotary second member also defining a through-bore, the rod extending through the through-bore of the second member and rotating therewith, the second member having a substantially cylindrical portion received coaxially in said recess, the cylindrical portion being defined by an outer cylindrical surface with a smaller diameter than the recess so as to leave an annular space between them, the annular space having an upstream end where oil under pressure seeks to enter the space, and a downstream end opposite the upstream end;
   said method comprising the steps;
   a) providing a plurality of stacked annular seal cartridges within said annular space, each cartridge having, in axial section: a knife edge corner in sliding contact with said cylindrical portion, a first open space downstream of said corner and adjacent the cylindrical portion, a second open space adjacent the cylindrical wall, and passageway means through which the two spaces are in communication,
   b) providing, for each seal cartridge, a leak passage through he first member, each leak passage communicating the respective open spaces with said external wall,
   c) injecting a lubricant through the leak passage of the furthest upstream seal cartridge and then plugging that leak passage, while leaving open the leak passage of a seal cartridge downstream of the furthest upstream cartridge,
   d) monitoring the left-open leak passage for leaking oil, and
   e) when such leaking oil is detected, shutting down the pump and replacing at least those seal cartridges past which oil has leaked.

18. The method claimed in claim 17, in which there are three seal cartridges: an upstream cartridge, a downstream cartridge and an intermediate cartridge; the method step c) further including plugging the leak passage of the downstream seal cartridge and leaving open only the leak passage of the intermediate seal cartridge.

19. The method claimed in claim 17, in which all leak passages are substantially identical and have, adjacent said external wall, internal threads for receiving identical threaded plug members; and in which there are three seal cartridges: an upstream cartridge, a downstream cartridge and an intermediate cartridge; the method step c) further including A) plugging the leak passage of the downstream seal cartridge and leaving open only the leak passage of the intermediate seal cartridge, B) monitoring the leak passage of the intermediate cartridge for leaking oil, C) when such leaking oil is detected, removing the plug member from the leak passage for the downstream cartridge and placing it in the leak passage for the intermediate cartridge, and leaving the downstream cartridge leak passage open, whereby steps d) and e) apply to the downstream cartridge.

* * * * *